366-332 SR
FIP8310 OR X 7,182
BEST AVAILABLE COPY
EXAMINER.
21750. J. Bennet,
Churn.
X7182 Patented July 25. 1832.
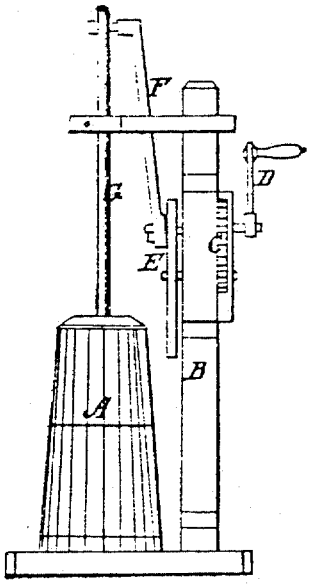

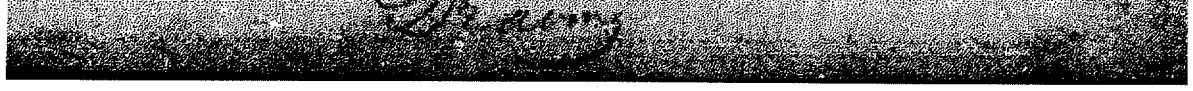

7182x

July 25, 1832

To all to whom these presents shall come: Be it Known
that I, James Bennet of the town of Brutus County of
Cayuga and State of New York, have invented a new and
useful improvement in a machine for churning, and that
the following is a full and exact description of the construction
and operation of the said machine, as invented or improved
by me.

The machine for churning consists of a post framed
into a piece of plank large enough for the churn to stand on,
with two cleats or feet under the same to cause it to stand
steady. The post may be from one and a half to two inches
thick, and about four inches wide, and from two and a
half to three and a half feet long. It may be made with
a joint to slide up and down and so constructed as to
rest on a small churn, that has not wight to hold it
steady, and there fastened with a thumb screw. The post
has two pinion wheels made of cast iron, or some other metal,
placed in it, one to be from two to three times as large
as the other. The largest one to have a crank attached
to it, to operate the same.

[illegible]

7182x July 25, 1832

The smallest one to have a balance wheel from two to eighteen inches in diameter, a pitman from about nine to fourteen inches long, the upper end to be attached to one of the arms of the balance wheel, and the lower end to the staff of the dasher. The staff to contain from one to six dashers according to the quantity of cream. The dashers are to be placed on the staff in a screwing position, so as to form two revolutions in the cream, a slow one round and a quick one up and down. The post has a mast arm framed into the post near the top through which the staff of the dasher pass in order to steady it.

Witnesses James Bennet

Teodore Popple
[illegible]
H. B. Tilley (357 [illegible])

Exd. W.H.C. (Patented July 25. 1832.)